US012544312B2

(12) United States Patent
Yarto

(10) Patent No.: US 12,544,312 B2
(45) Date of Patent: Feb. 10, 2026

(54) DOSAGE TRACKING APPARATUS

(71) Applicant: Shari Yarto, Dallas, TX (US)

(72) Inventor: Shari Yarto, Dallas, TX (US)

( * ) Notice: Subject to any disclaimer, the term of this patent is extended or adjusted under 35 U.S.C. 154(b) by 221 days.

(21) Appl. No.: 18/339,617

(22) Filed: Jun. 22, 2023

(65) Prior Publication Data

US 2023/0329976 A1 Oct. 19, 2023

Related U.S. Application Data

(63) Continuation-in-part of application No. 17/335,197, filed on Jun. 1, 2021, now Pat. No. 11,723,843.

(51) Int. Cl.
*A61J 7/04* (2006.01)
*G09F 3/02* (2006.01)

(52) U.S. Cl.
CPC .......... *A61J 7/0409* (2013.01); *G09F 3/0288* (2013.01); *A61J 2205/50* (2013.01); *G09F 2003/0273* (2013.01)

(58) Field of Classification Search
CPC ... A61J 7/0409; A61J 2205/50; G09F 3/0288; G09F 2003/0273
USPC .......................................................... 221/2
See application file for complete search history.

(56) References Cited

U.S. PATENT DOCUMENTS 337,713 A * 3/1886 Snypp ...................... G09F 3/04 40/310
399,916 A * 3/1889 Mills ......................... A45F 3/00 224/684
612,296 A * 10/1898 Woodward ............ G01F 13/001 215/390
1,221,572 A * 4/1917 Morton ..................... G09F 3/04 40/310
1,397,079 A * 11/1921 Cohen ....................... G09F 3/18 40/665
1,421,219 A * 6/1922 Harmon .................. G09F 3/202 40/658
1,701,888 A * 2/1929 Hofferberth ......... A44C 5/0046 235/1 B
1,717,060 A * 6/1929 Mottayaw ................. A61J 7/04 116/DIG. 1
1,796,398 A * 3/1931 Richardson ............... A61J 7/04 40/310
1,935,842 A * 11/1933 Freel ...................... G04B 19/23 968/168
2,099,295 A * 11/1937 Canfield ................ B42D 5/006 224/267
2,130,873 A * 9/1938 Bourquin ............. G04B 19/202 D10/15
2,296,551 A * 9/1942 Hilario ..................... G09D 3/06 40/112
2,347,823 A * 5/1944 Goodman ............ A47K 10/422 312/50
2,450,264 A * 9/1948 Woodruff ............. G04B 19/223 968/167

(Continued)

*Primary Examiner* — Rakesh Kumar
(74) *Attorney, Agent, or Firm* — Akona IP PC

(57) ABSTRACT

One embodiment is an assembly comprising a tracking mechanism comprising an hour indicator and a day indicator; a strap retention structure coupled to a back side of the tracking mechanism; and a flexible strap connected to the back side of the tracking mechanism by the strap retention structure, the flexible strap configured to encircle a container to removably attach the tracking mechanism to a side of the container.

15 Claims, 4 Drawing Sheets

(56) References Cited

U.S. PATENT DOCUMENTS

| | | | | | | |
|---|---|---|---|---|---|---|
| 2,593,905 | A | * | 4/1952 | Lux | G04F 3/022 | 368/97 |
| 2,625,131 | A | * | 1/1953 | Sturhahn | B65D 23/12 | 40/310 |
| 2,833,028 | A | * | 5/1958 | Treimann | A47F 1/06 | 29/814 |
| 2,916,837 | A | * | 12/1959 | Bosland | G09D 3/06 | 40/114 |
| 2,945,312 | A | * | 7/1960 | Book | G09B 29/00 | 40/503 |
| 3,215,344 | A | * | 11/1965 | Joffe | G06C 3/00 | 235/78 R |
| 3,227,127 | A | * | 1/1966 | Gayle | A61J 7/04 | 206/533 |
| 3,454,152 | A | * | 7/1969 | Vanderhyde | B65D 83/0454 | 206/533 |
| 3,534,905 | A | * | 10/1970 | Leo | G06C 3/00 | 116/308 |
| 3,901,407 | A | * | 8/1975 | Mitchell | B60K 15/04 | 220/326 |
| 4,037,719 | A | * | 7/1977 | Perlmutter | A24F 15/005 | 131/270 |
| 4,041,628 | A | * | 8/1977 | Sasson | G09D 3/06 | 116/308 |
| 4,224,894 | A | * | 9/1980 | Haldemann | G09F 11/23 | 40/495 |
| 4,361,408 | A | * | 11/1982 | Wirtschafter | G04G 13/00 | 968/347 |
| 4,383,425 | A | * | 5/1983 | Orabona | E05B 37/02 | 70/312 |
| 4,448,541 | A | * | 5/1984 | Wirtschafter | A61J 7/0436 | 368/320 |
| 4,572,376 | A | * | 2/1986 | Wrennall | A61J 7/04 | 220/253 |
| 4,860,684 | A | * | 8/1989 | Al-Harbi | A61J 9/00 | 40/310 |
| 4,886,010 | A | * | 12/1989 | Stutzman | G09F 11/23 | 116/318 |
| 4,926,572 | A | * | 5/1990 | Holmes | G09F 3/00 | 40/448 |
| 5,011,032 | A | * | 4/1991 | Rollman | A61J 7/04 | 116/323 |
| 5,050,139 | A | * | 9/1991 | Oberst | G04B 19/266 | 368/19 |
| 5,129,352 | A | * | 7/1992 | Roberts | G09F 11/23 | 116/318 |
| 5,271,353 | A | * | 12/1993 | Besthorne | A61J 7/04 | 116/318 |
| 5,305,291 | A | * | 4/1994 | Kamens | G04C 3/008 | 368/252 |
| 5,319,872 | A | * | 6/1994 | Bammate | F42B 39/00 | 224/663 |
| 5,337,897 | A | * | 8/1994 | Yablans | B65D 83/0858 | 206/823 |
| 5,377,614 | A | * | 1/1995 | Glazer | G09F 11/23 | 116/318 |
| 5,460,295 | A | * | 10/1995 | Law | B65D 83/0418 | 221/199 |
| 5,531,481 | A | * | 7/1996 | Wiltshire | B42D 5/005 | 224/267 |
| 5,574,268 | A | * | 11/1996 | Herman | G06M 1/163 | 116/223 |
| 5,577,335 | A | * | 11/1996 | Tucker | A47B 23/044 | 215/230 |
| 5,694,882 | A | * | 12/1997 | Marshall | B65D 51/245 | 116/319 |
| 5,719,780 | A | * | 2/1998 | Holmes | A61J 7/0481 | 700/231 |
| 5,802,014 | A | * | 9/1998 | Danko | A61J 7/0481 | 368/282 |
| 6,000,159 | A | * | 12/1999 | Hornung | G09F 11/23 | 215/230 |
| 6,000,589 | A | * | 12/1999 | Burdine | F41A 9/65 | 224/931 |
| 6,098,835 | A | * | 8/2000 | DeJonge | G07F 11/24 | 221/25 |
| 6,145,697 | A | * | 11/2000 | Gudish | A61J 7/0481 | 221/3 |
| 6,152,067 | A | * | 11/2000 | Mathison | A61J 7/04 | 206/459.1 |
| 6,259,654 | B1 | * | 7/2001 | de la Huerga | A61J 7/0481 | 368/10 |
| 6,276,533 | B1 | * | 8/2001 | Kaplan | B65D 51/245 | 206/459.1 |
| 6,530,509 | B1 | * | 3/2003 | Davis | A45C 11/34 | 224/221 |
| 6,652,047 | B1 | * | 11/2003 | Maguire, Jr. | A61J 7/04 | 206/534 |
| 6,802,279 | B1 | * | 10/2004 | Johnson | G09F 11/23 | 40/310 |
| 7,004,111 | B2 | * | 2/2006 | Olson | A01K 5/0114 | 224/267 |
| 7,061,832 | B1 | * | 6/2006 | Lansing | A61J 9/00 | 368/242 |
| 7,222,736 | B1 | * | 5/2007 | Seijas | A61J 7/04 | 116/318 |
| 7,555,995 | B1 | * | 7/2009 | Stump | A61J 7/04 | 116/318 |
| 7,597,122 | B1 | * | 10/2009 | Smith | A61L 2/0088 | 222/105 |
| 7,621,273 | B2 | * | 11/2009 | Morton | A61M 15/0065 | 128/205.23 |
| 7,766,188 | B2 | * | 8/2010 | Pocock | G06M 1/248 | 222/23 |
| 8,146,528 | B2 | * | 4/2012 | Fralick | A61J 7/04 | 116/316 |
| 8,302,783 | B1 | * | 11/2012 | Harris | A47F 1/06 | 211/59.3 |
| 8,763,553 | B1 | * | 7/2014 | Shannehan | A61J 7/04 | 116/308 |
| 8,896,428 | B2 | * | 11/2014 | Shalala | A61J 7/0481 | 340/309.16 |
| 8,904,951 | B1 | * | 12/2014 | Hronek | A63B 71/0669 | 116/225 |
| 8,938,999 | B2 | * | 1/2015 | Dahl | B65D 55/145 | 70/165 |
| 9,134,288 | B1 | * | 9/2015 | Ettinger | G09F 11/02 | |
| 9,244,440 | B2 | * | 1/2016 | Pantchenko | G04F 3/06 | |
| 9,259,375 | B2 | * | 2/2016 | Miller | A61J 1/03 | |
| 9,459,062 | B2 | * | 10/2016 | Shaskan | F42B 39/02 | |
| 9,738,433 | B2 | * | 8/2017 | Hogg | H01M 50/264 | |
| 10,213,365 | B1 | * | 2/2019 | Sukkarieh | A61J 7/0076 | |
| D848,290 | S | * | 5/2019 | Janzen | D10/39 | |
| 10,286,368 | B2 | * | 5/2019 | Deshpande | B65D 25/08 | |
| 10,492,996 | B1 | * | 12/2019 | Winter | A61J 7/0076 | |
| 10,792,551 | B2 | * | 10/2020 | Green, Jr. | G06F 3/0202 | |
| 11,110,035 | B1 | * | 9/2021 | Staggs | B65D 83/0418 | |
| 11,116,698 | B2 | * | 9/2021 | Brady | G16H 20/13 | |
| 11,535,435 | B2 | * | 12/2022 | Netter | G06V 40/172 | |
| 11,672,740 | B1 | * | 6/2023 | Norman | A61J 7/0436 | 340/539.1 |
| 11,932,469 | B2 | * | 3/2024 | Concari | B65D 51/245 | |
| 2002/0118604 | A1 | * | 8/2002 | Sharma | A61J 7/0481 | 368/10 |
| 2003/0011190 | A1 | * | 1/2003 | Ryan | B42D 5/005 | 281/51 |
| 2003/0074903 | A1 | * | 4/2003 | Upadhye | A47J 36/2438 | 219/501 |
| 2004/0221840 | A1 | * | 11/2004 | Stockman-Lamb | A61J 7/0472 | 128/200.23 |
| 2006/0180566 | A1 | * | 8/2006 | Mataya | A61J 1/1425 | 215/230 |
| 2006/0181961 | A1 | * | 8/2006 | Hobkirk | G04B 47/02 | 368/10 |
| 2006/0207958 | A1 | * | 9/2006 | Hamer | E05B 73/0041 | 215/206 |
| 2007/0056503 | A1 | * | 3/2007 | Sollaccio | G09F 11/23 | 116/308 |

(56) References Cited

U.S. PATENT DOCUMENTS

2007/0187282 A1* 8/2007 Seijas ........................ A61J 7/04
116/318
2008/0098939 A1* 5/2008 Kalous .................... E05G 1/005
109/52
2009/0025625 A1* 1/2009 Lee ......................... G09F 11/23
116/223
2009/0139516 A1* 6/2009 Augustyn ............. G06M 3/025
128/200.23
2009/0178609 A1* 7/2009 Kreshek .................. G09F 11/23
116/308
2009/0242452 A1* 10/2009 Perry ................. B65D 83/0481
206/534
2009/0293798 A1* 12/2009 Kreshek .................. G09F 11/23
116/308
2010/0294692 A1* 11/2010 Gelardi .............. B65D 83/0445
206/468
2010/0327006 A1* 12/2010 Campo ..................... F41A 9/82
221/185
2011/0067623 A1* 3/2011 Fagan ..................... G09F 11/23
235/494
2011/0210136 A1* 9/2011 Wang ................... B65D 55/145
220/831
2012/0006252 A1* 1/2012 Warner ................... G09F 11/23
116/284
2012/0240842 A1* 9/2012 Edwards ................. G09F 11/23
116/327
2014/0214200 A1* 7/2014 Chrusciel .............. A61J 7/0076
221/15
2014/0352603 A1* 12/2014 Gortot ....................... G09F 3/06
116/308
2015/0078139 A1* 3/2015 Raiti de Boyles ........ A61J 7/04
368/10
2015/0325152 A1* 11/2015 Horn ...................... G09B 19/00
434/408
2018/0178955 A1* 6/2018 West .................... B65D 51/245
2022/0378660 A1* 12/2022 Yarto .................... A61J 7/0481
2023/0329976 A1* 10/2023 Yarto .................... A61J 7/0481
2024/0407974 A1* 12/2024 Ahmed ................. A61J 1/1412

* cited by examiner

DOSAGE TRACKING APPARATUS

CROSS-REFERENCE TO RELATED APPLICATION

This application is a continuation and claims the benefit of priority under 35 U.S.C. § 120 of U.S. application Ser. No. 17/335,497, filed on Jun. 1, 2021, entitled "PILL REMINDER MECHANISM." The disclosure of the prior application is considered part of and is incorporated in its entirety by reference in the disclosure of this application.

TECHNICAL FIELD

This disclosure relates in general to the field of medication dosage tracking apparatuses and, more specifically, to a medication dosage tracking apparatus that is removably attachable to a medication container.

BACKGROUND

Medication, which is defined herein to include substances (including but not limited to prescription medication, vitamins and other nutritional supplements, and over-the-counter (OTC) medications), taken by or administered to an individual in the form of pills, tablets, capsules, powders, and/or liquids, to improve the health of an individual, is a critical daily support element for a large segment of the population. Medications may be administered orally or by other means, such as suppositories or injections, for example.

Many medications are more effective, and sometimes only effective, if taken precisely at the time or times specified in a prescription. Tracking mechanisms can be helpful in this regard; however, tracking mechanisms may themselves be difficult to keep track of. Moreover, if an individual is using multiple tracking mechanisms, it may be difficult to ascertain to which medication or supplement a particular tracking mechanism relates.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
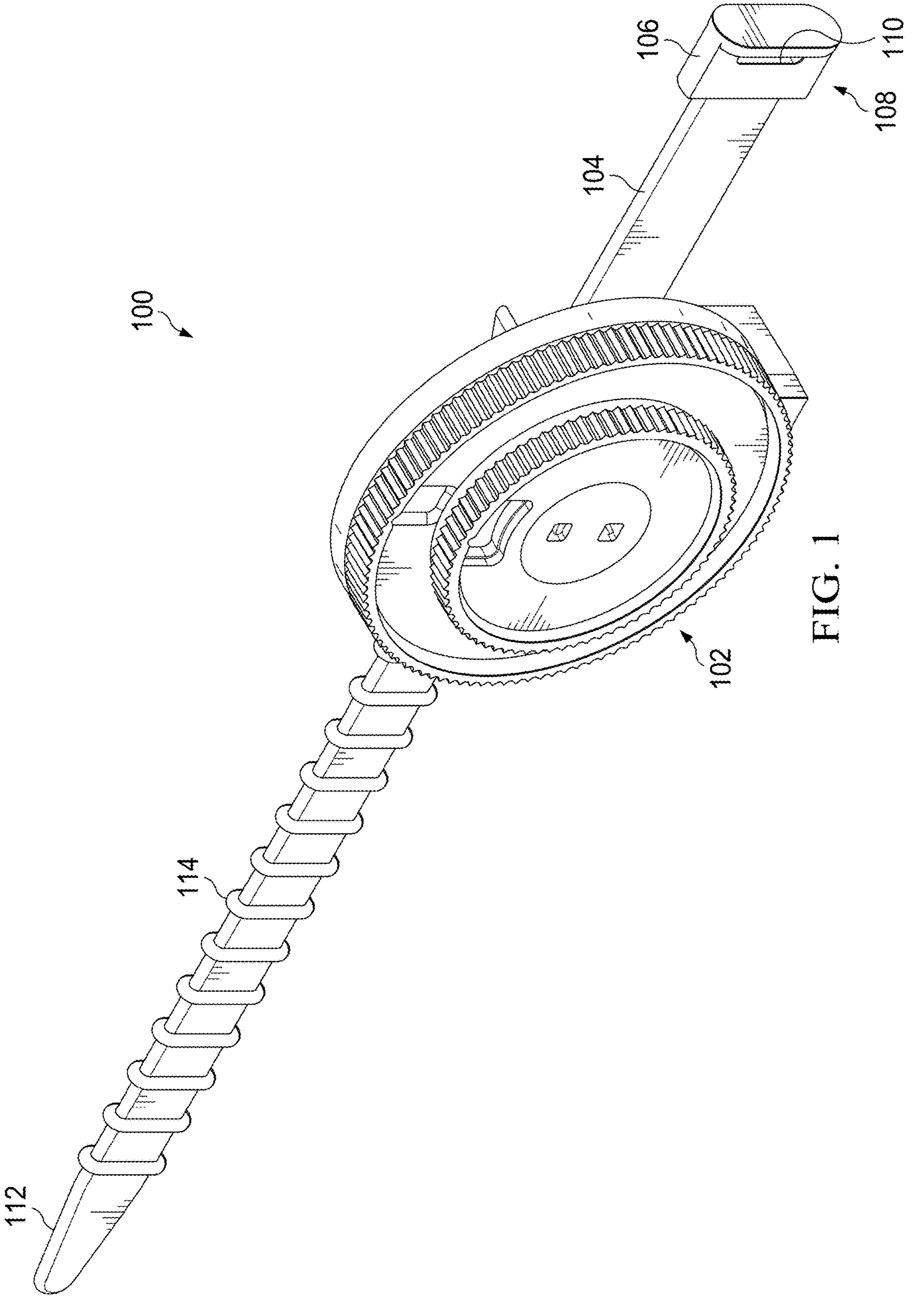
FIG. 1 illustrates a front perspective view of an example dosage tracking assembly in accordance with features of embodiments described herein.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying figures.

Figure 2:
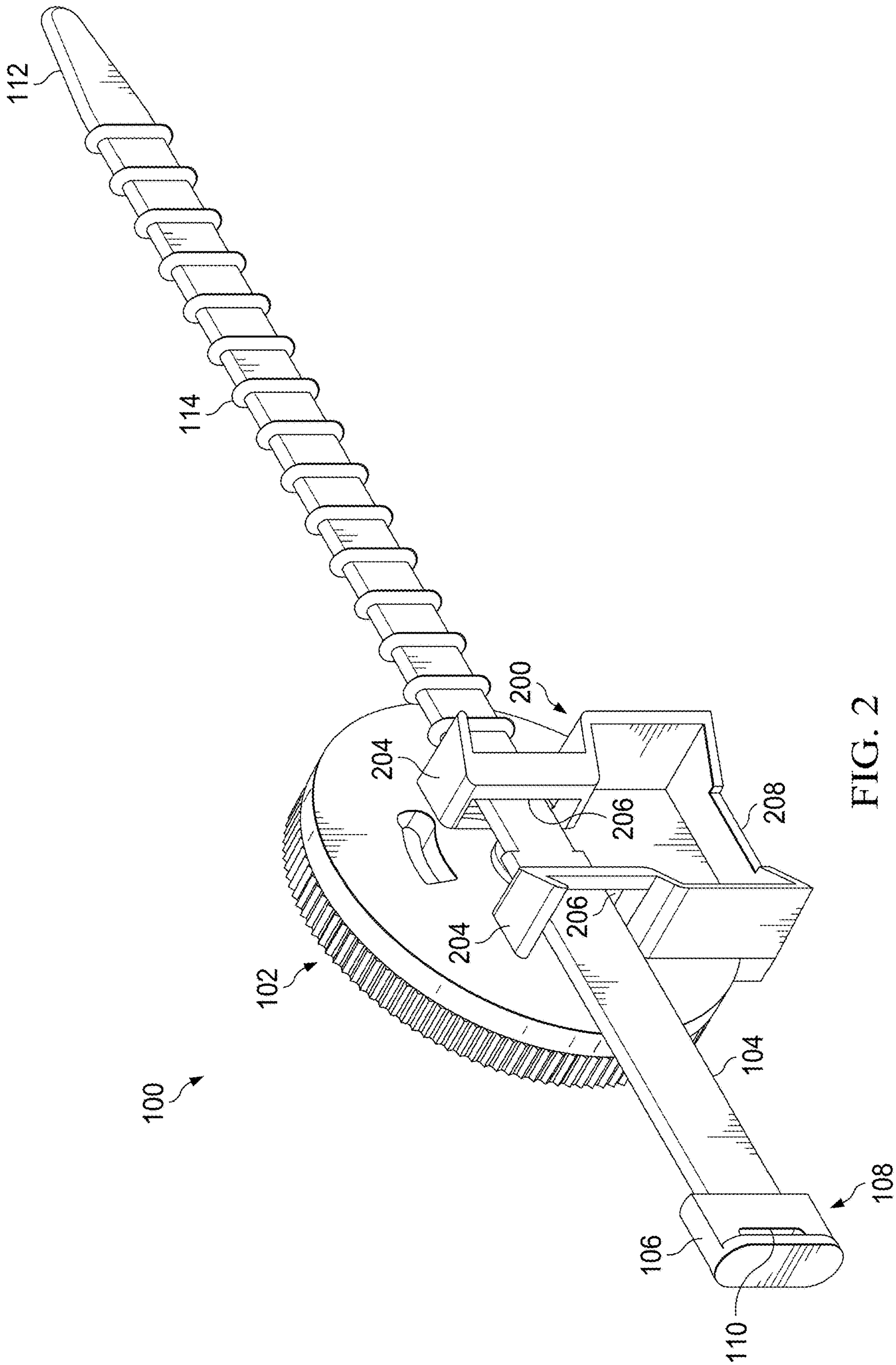
FIG. 2 illustrates a rear perspective view of the dosage tracking assembly of FIG. 1.

FIG. 1 illustrates an example dosage tracking assembly 100 in accordance with features of embodiments described herein. As shown in FIG. 1, dosage tracking assembly 100 (which may also be referred to herein simply as "assembly 100") includes a tracking mechanism 102 and a flexible strap 104 coupled to the back side of tracking mechanism, as best shown in FIG. 2. In one embodiment, as will be described in greater detail below with reference to FIG. 4, assembly 100 is configured to be detachably coupled to a medication bottle or other container for medication.

In particular embodiments, a retention member 106 is provided on one end 108 of strap 104 and includes a slot 110 for receiving an opposite end 112 of strap 104. End 112 may be shaped such that it is easily introduced into and subsequently pulled through slot 110 to a desired location on strap 104. In particular embodiments, strap 104 is wrapped around a medication container prior to introducing end 112 into slot 110, at which point, end 112 may be pulled through slot 110 until retention mechanism 106 is at the desired location (i.e., until strap 104 is wrapped tightly around medication container).

In certain embodiments, strap 104 may comprise a material such as silicone, rubber, plastic, or the like, for example, and ribs 114 may be provided along a portion of a length of strap 104 (e.g., proximate end 112) and positioned an appropriate distance from one another for retaining the retention member 106 at a desired location along the length of strap 104. It will be recognized that other means of tightening and retaining the strap at a desired tightness may be employed without departing from the spirit or scope of the disclosure. For example, retention mechanism 106 may comprise a ratcheting mechanism for retaining 104 in place around a container, in which case ribs 114 could be eliminated and strap 104 could comprise fabric.

Referring now also to FIG. 2, in particular embodiments, a strap retention and support structure 200 is provided on the back surface of mechanism 102. As shown in FIG. 2, structure 200 includes a pair of strap retention members 204 projecting perpendicularly from the back surface of mechanism 102, the strap retention members 204 defining slots 206 for receiving strap 104 therethrough and retaining strap 104 on the mechanism 102. Structure 200 further includes a base support member 208 for purposes that will be described in greater detail below with reference to FIG. 4.

Figure 3:
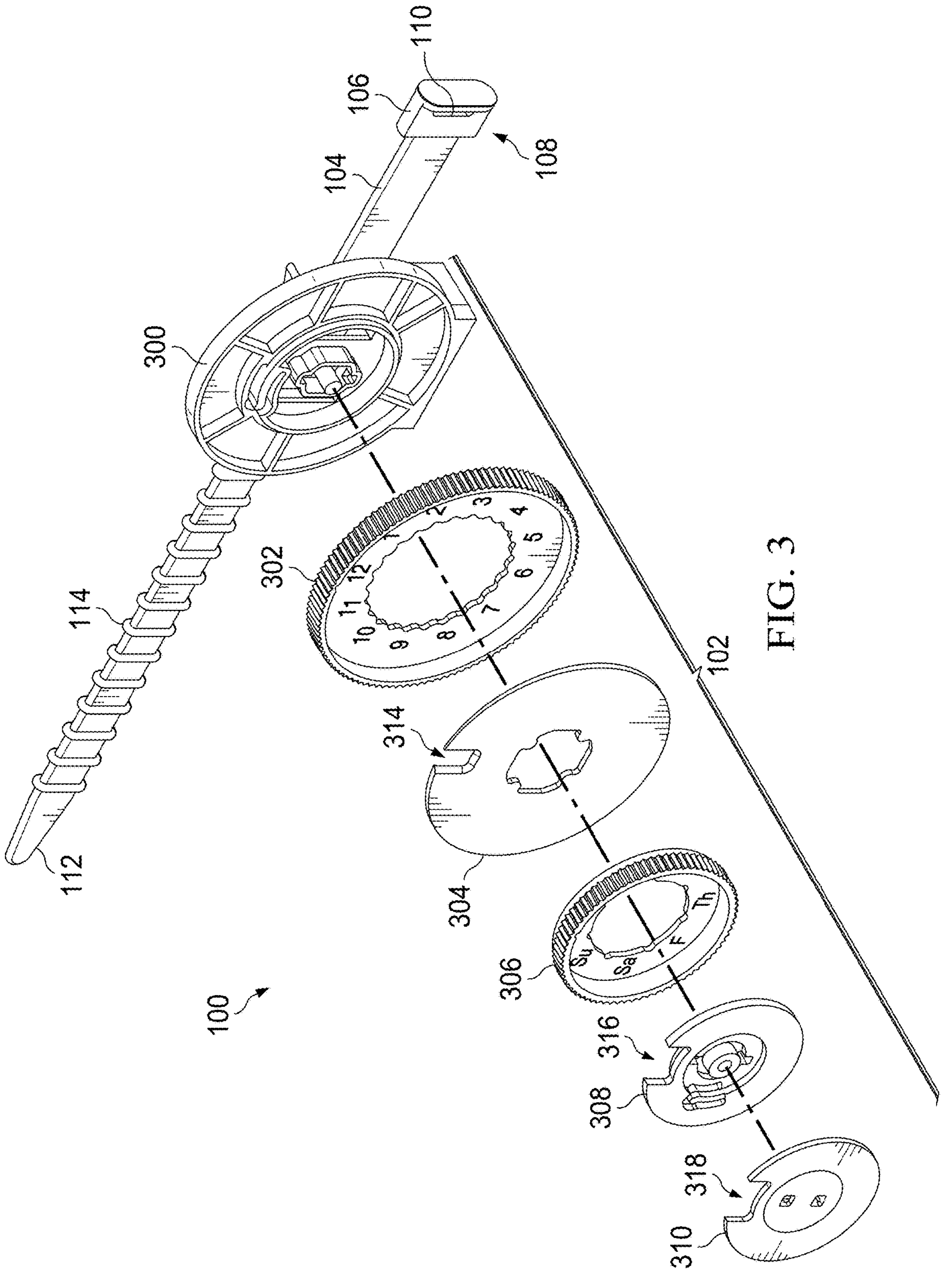
FIG. 3 illustrates an exploded view of the dosage tracking assembly of FIG. 1.

FIG. 3 is an exploded view of assembly 100, and in particular of tracking mechanism 102. As illustrated in FIG. 3, tracking mechanism 102 comprises a plurality of disk-shaped members, including a base plate 300 (comprising structure 200 on the back surface thereof), an hour wheel 302, an hour face 304, a day wheel 306, a center hub 308, and a face plate 310. In one embodiment, the hour wheel 302 may be rotatably coupled to the base plate 300. The hour face 304 may be coupled to the hour wheel 302 to comprise an hour indicator. The day wheel 306 may be rotatably coupled to the hour face 304. The center hub 308 may be coupled to the day wheel 306 to collectively comprise a day indicator. The face plate 310 may be coupled to the center hub 308. In particular embodiments, one or more of components 302-310 may be rotatably attached to one another and to the base plate 300 via one or more attachment mechanisms, such as a screw. The screw may be tightened to a level that allows various components of mechanism 102 to rotate about an axis 312. It will be appreciated that other coupling mechanisms may be deployed to secure the components of mechanism 102 together in a similar manner such that various ones of the components are rotatable about axis 312 in response to application of sufficient rotational force applied to the component.

In particular embodiments, hour wheel 302 may be rotated about axis 312 by applying rotational force to outer edge of hour wheel 302. Ridges may be provided on the outer edge of hour wheel 302 to aid in the application of sufficient rotational force thereto. Characters representing hours of a day (e.g., 0, 1, 2, . . . 24, or 1 AM, 2 AM, 3 AM . . . 12 PM) may be provided around the periphery of hour wheel 302 on the front surface thereof. In operation, a user can select an hour to be displayed through a window 314 of hour face 304 by rotating hour wheel 302 relative to hour face 304 until the desired hour is visible through window 314. Similarly, in particular embodiments, day wheel 306 may be rotated about axis 312 by applying rotational force to outer edge of day wheel 306. Ridges may be provided on the outer edge of day wheel 306 to aid in the application of sufficient rotational force thereto. Characters representing days of the week (e.g., SUN, MON, TUE, . . . SAT) may be provided around the periphery of day wheel 306 on the front surface thereof. In operation, a user can select a day to be displayed through a window 316 of hour face 308 and a window 318 of face plate 310 by rotating day wheel 306 relative to those components until the desired day is visible through window 316.

Figure 4:
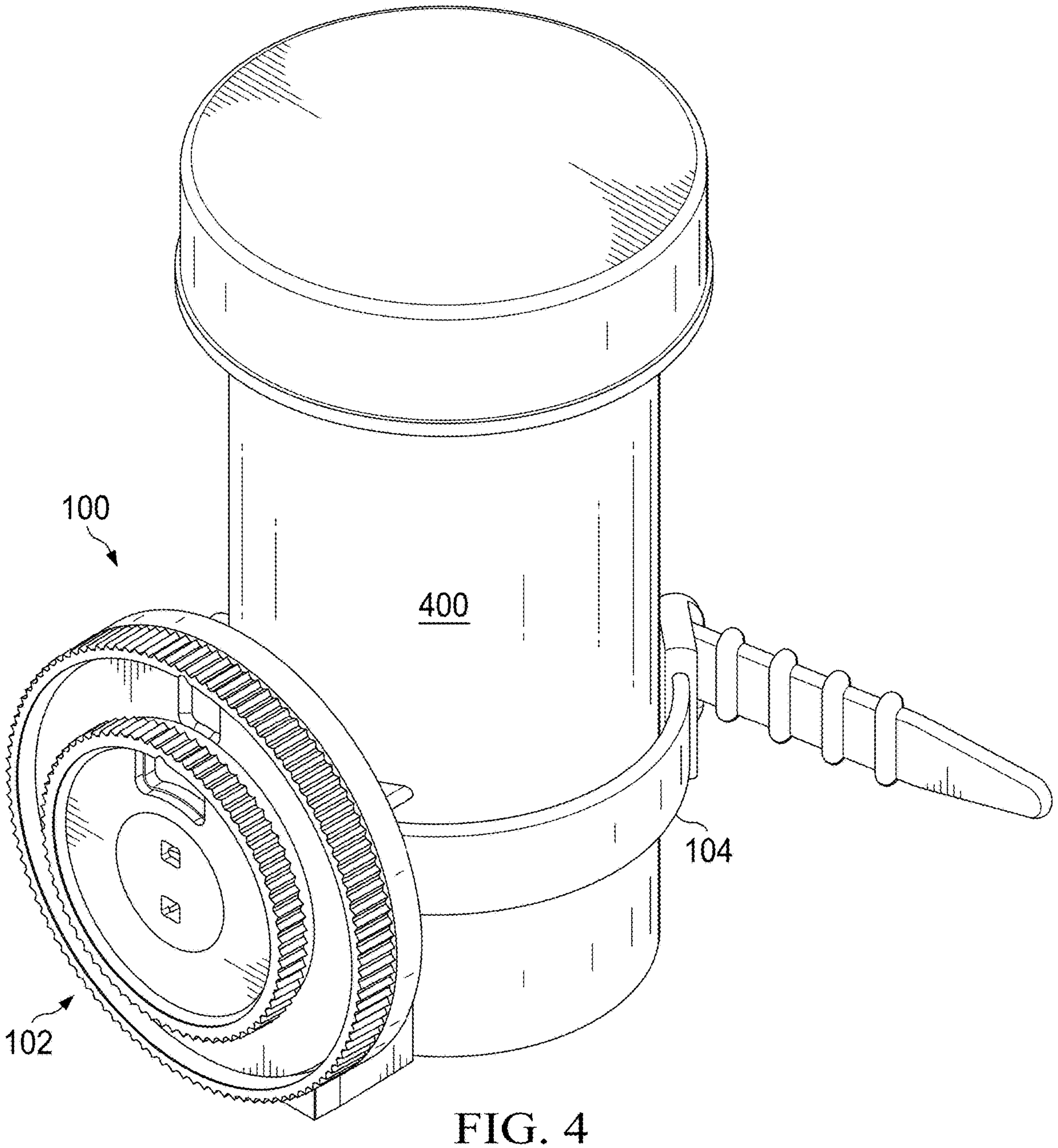
FIG. 4 illustrates a front perspective view of the dosage tracking assembly of FIG. 1 attached to a medication container in accordance with features of embodiments described herein.

As shown in FIG. 4, assembly 100 is configured such that it may be detachably coupled to a medication container 400 by tightening the strap 104 around the container 400. In particular embodiments, assembly 100 may be coupled to medication container 400 such that base 208 aligns with the bottom surface of the container in order to prevent the container 400 from tipping forward from the weight of assembly 100.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, Ru, is disclosed, any number falling within the range is specifically disclosed. In particular, the following numbers within the range are specifically disclosed: R=RI+k*(Ru—RI), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C. The terms "substantially," "close," "approximately," "near," and "about," generally refer to being within +/−5-20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An assembly comprising:

a tracking mechanism comprising an hour indicator and a day indicator;

a strap retention and support structure coupled to a back side of the tracking mechanism; and a flexible strap connected to the back side of the tracking mechanism by the strap retention and support structure, the flexible strap configured to encircle a container to removably attach the tracking mechanism to a side of the container;

wherein the hour indicator comprises a first disk having a window disposed therethrough and a second disk rotatably connected to the first disk wherein a portion of a front surface of the second disk is visible through the window, wherein the portion of the front surface of the second disk that is visible through the window is selectable by rotating the second disk relative to the first disk;

wherein the first and second disks are concentric; and wherein the day indicator comprises a third disk having a window disposed therethrough and a fourth disk rotatably connected to the third disk wherein a portion of a front surface of the fourth disk is visible through the window, wherein the portion of the front surface of the fourth disk that is visible through the window is selectable by rotating the fourth disk relative to the third disk.

2. The assembly of claim 1, wherein the strap retention and support structure comprises a pair of flanges each having a slot therethrough, wherein the flexible strap is disposed through the slots.

3. The assembly of claim 1, wherein the strap retention and support structure comprises a base support member, wherein when the tracking mechanism is attached to the container and the container is supported on a surface, the base support member is in contact with the surface to prevent the container from tipping.

4. The assembly of claim 1, wherein the flexible strap comprises at least one of silicone, rubber, and plastic.

5. The assembly of claim 4, wherein the flexible strap comprises a plurality of ribs.

6. The assembly of claim 5, wherein the ribs are disposed along a portion of a length of the flexible strap.

7. The assembly of claim 1, wherein the flexible strap comprises a ratcheting mechanism.

8. The assembly of claim 7, wherein the flexible strap comprises fabric.

9. The assembly of claim 1, wherein the third and fourth disks are concentric.

10. The assembly of claim 1, wherein the portion of the front surface of the second disk comprises one or more characters representing an hour of the day.

11. The assembly of claim 10, wherein the portion of the front surface of the disk comprises one or more characters representing a day of the week.

12. A dosage tracking assembly comprising:

a tracking mechanism comprising an hour indicator and a day indicator;

a strap retention and support structure coupled to a back side of the tracking mechanism, the strap retention and support structure comprising:

a strap retention member comprising a pair of flanges each having a slot therethrough; and a base support member; and a flexible strap disposed through the slots of the strap retention member, the flexible strap configured to encircle a container to removably attach the tracking mechanism to a side of the container;

wherein the base support member includes a substantially flat bottom surface configured to contact a surface on which the container is supported to inhibit the container from tipping;

wherein the day indicator comprises a first disk having a window disposed therethrough and a second disk rotatably connected to the first disk wherein a portion of a front surface of the second disk is visible through the window, wherein the portion of the front surface of the second disk that is visible through the window is selectable by rotating the second disk relative to the first disk, wherein the portion of the front surface of the second disk comprises one or more characters representing a day of the week;

wherein the first and second disks are concentric; and wherein the hour indicator comprises a third disk having a window disposed therethrough and a fourth disk rotatably connected to the third disk wherein a portion of a front surface of the fourth disk is visible through the window, wherein the portion of the front surface of the fourth disk that is visible through the window is selectable by rotating the fourth disk relative to the third disk, wherein the portion of the front surface of the fourth disk comprises one or more characters representing an hour of the day.

13. The dosage tracking assembly of claim 12, wherein the third and fourth disks are concentric.

14. The dosage tracking assembly of claim 12, wherein the flexible strap comprises at least one of silicone, rubber, and plastic, the flexible strap further comprising a plurality of ribs disposed along a portion of a length of the flexible strap.

15. The dosage tracking assembly of claim 12, wherein the flexible strap comprises a ratcheting mechanism, the flexible strap further comprising fabric.

* * * * *